(12) United States Patent
Nagamitsu

(10) Patent No.: US 12,153,918 B2
(45) Date of Patent: Nov. 26, 2024

(54) SOFTWARE UPDATE APPARATUS, UPDATE CONTROL METHOD, NON-TRANSITORY STORAGE MEDIUM STORING UPDATE CONTROL PROGRAM, SERVER, OTA MASTER, AND CENTER

(71) Applicant: TOYOTA JIDOSHA KABUSHIKI KAISHA, Toyota (JP)

(72) Inventor: Shoichi Nagamitsu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 17/305,531

(22) Filed: Jul. 9, 2021

(65) Prior Publication Data

US 2022/0019424 A1   Jan. 20, 2022

(30) Foreign Application Priority Data

Jul. 20, 2020   (JP) .................................. 2020-123929

(51) Int. Cl.
*G06F 8/654*   (2018.01)

(52) U.S. Cl.
CPC .................................. *G06F 8/654* (2018.02)

(58) Field of Classification Search
CPC ............. H04W 4/44; G06F 8/65; G06F 8/654
See application file for complete search history.

(56) References Cited

U.S. PATENT DOCUMENTS

| 2015/0169313 | A1* | 6/2015 | Katsura ..................... G06F 8/65 |
| | | | 717/170 |
| 2015/0212807 | A1* | 7/2015 | Elzein ..................... H04L 67/34 |
| | | | 717/173 |
| 2018/0018160 | A1* | 1/2018 | Teraoka ..................... G06F 8/65 |
| 2019/0354363 | A1* | 11/2019 | Nakaguma ............ G06F 9/4411 |
| 2020/0050378 | A1* | 2/2020 | Sakurai ..................... G06F 8/654 |
| 2021/0155173 | A1 | 5/2021 | Harata et al. |

FOREIGN PATENT DOCUMENTS

| JP | 2004-326689 A | 11/2004 |
| JP | 2020-27638 A | 2/2020 |
| JP | 2020-020440 A | 2/2022 |
| JP | 2022-020440 A | 2/2022 |
| WO | 2020/032194 A1 | 2/2020 |
| WO | WO 2020/032115 A1 | 2/2020 |

* cited by examiner

*Primary Examiner* — S. Sough
*Assistant Examiner* — Cheneca Smith
(74) *Attorney, Agent, or Firm* — Oblon, McClelland, Maier & Neustadt, L.L.P.

(57) ABSTRACT

A software update apparatus controls software update of an electronic control unit. The software update apparatus includes a control unit configured to, when a software update process of the electronic control unit is executed, control a timing for executing an approval request process for requesting an approval for the software update process according to the type of non-volatile memory included in an electronic control unit to be updated.

8 Claims, 9 Drawing Sheets

SOFTWARE UPDATE APPARATUS, UPDATE CONTROL METHOD, NON-TRANSITORY STORAGE MEDIUM STORING UPDATE CONTROL PROGRAM, SERVER, OTA MASTER, AND CENTER

CROSS-REFERENCE TO RELATED APPLICATION

This application claims priority to Japanese Patent Application No. 2020-123929 filed on Jul. 20, 2020, incorporated herein by reference in its entirety.

BACKGROUND

1. Technical Field

The present disclosure relates to a software update apparatus, an update control method, a non-transitory storage medium storing an update control program, a server, an OTA master, and a center that are used for controlling update of software of an electronic control unit.

2. Description of Related Art

A plurality of electronic control units (ECUs) used for controlling an operation of a vehicle is mounted on the vehicle. The ECU includes a processor, a transitory storage unit, such as a RAM, and a non-volatile storage unit, such as a flash ROM, and the processor implements a control function of the ECU by executing software stored in the non-volatile storage unit. Software stored in each ECU is rewritable and is updated to a newer software version such that a function of each ECU can be enhanced or a new vehicle control function can be added.

As a technology for updating the software of the ECU, an Over The Air (OTA) technology that updates or adds a program of the ECU by wirelessly connecting an in-vehicle communication device connected to an in-vehicle network and a communication network, such as the Internet, downloading software from a server via wireless communication, and installing the downloaded software is well-known (see, for example, Japanese Unexamined Patent Application Publication No. 2004-326689).

As a non-volatile memory (a storage unit) mounted on the ECU, there are a memory including one storage area used for storing software (a one-sided memory) and a memory including two storage areas used for storing software (a two-sided memory), and they are separately used according to, for example, specifications of the ECU. The ECU having the two-sided memory mounted thereon can store two versions (old and new) of programs in two storage areas.

SUMMARY

A software update process by an OTA includes a phase of downloading update data from a server by a software update apparatus, a phase of transferring the downloaded update data to an electronic control unit to be updated and installing the update data to a storage area of the electronic control unit to be updated, and a phase of activating the software after the updating of the electronic control unit to be updated.

In the ECU having the above-described two-sided memory mounted thereon, it is possible to maintain current software stored in one storage area, and install an updated version of the software in the other storage area. On the other hand, in the ECU having the above-described one-sided memory mounted thereon, the current software stored in the storage area is rewritten with the updated version of the software by installing the updated version of the software.

When software is updated by the OTA, it is necessary to notify a user or an administrator of a vehicle function to be changed by the software update, a function restriction that occurs during a software update process, or the like, and request an approval from the user or the administrator.

However, as described above, since a timing at which the electronic control units to be updated is influenced varies depending on specifications of a non-volatile memory mounted on the electronic control unit, there is room for re-considering a timing for requesting the approval.

Therefore, the present disclosure provides a software update apparatus, an update control method, a non-transitory storage medium storing an update control program, a server, an OTA master, and a center that can change an approval timing according to specifications of an electronic control unit at the time of software update.

A first aspect of the present disclosure is a software update apparatus that controls software update of an electronic control unit. The software update apparatus includes a control unit configured to, when a software update process of the electronic control unit is executed, control a timing for executing an approval request process for requesting an approval for the software update process according to a type of non-volatile memory included in an electronic control unit to be updated.

In the first aspect, when the non-volatile memory mounted on at least one electronic control unit to be updated is a first-kind memory, the control unit may execute the approval request process before the update data is installed in a storage area of the non-volatile memory and when the non-volatile memory mounted on the electronic control unit to be updated is a second-kind memory, the control unit may execute the approval request process after the update data is installed in a storage area, which is not a target to be read, of the non-volatile memory and before the storage area in which the update data is written is activated as a target to be read.

In the first aspect, the software update apparatus may include a determination unit that determines whether the non-volatile memory mounted on the electronic control unit to be updated is the first-kind memory including one storage area or the second-kind memory including two storage areas. Based on a determination result by the determination unit, the control unit may control a timing for executing the approval request process.

In the first aspect, the software update apparatus may include a storage unit that stores the kind of non-volatile memory mounted on the electronic control unit. Based on the kind of non-volatile memory stored in the storage unit, the determination unit may determine the kind of non-volatile memory of the electronic control unit to be updated.

In the first aspect, the software update apparatus may include a communication unit that receives, from a server, the kind of non-volatile memory mounted on the electronic control unit and a storage unit that stores the received kind of non-volatile memory. Based on the kind of non-volatile memory stored in the storage unit, the determination unit may determine the kind of non-volatile memory of the electronic control unit to be updated.

In the first aspect, the software update apparatus may include a communication unit that receives, from a server, instruction information for an instruction on the timing for executing the approval request process based on the kind of non-volatile memory included in the electronic control unit to be updated. Based on the received instruction information, the control unit may control the timing for executing the approval request process.

In the first aspect, the control unit may cause a display device to display a screen used for requesting an approval for the software update in the approval request process.

An update control method according to a second aspect of the present disclosure is a method of controlling software update of an electronic control unit which is executed by a computer including a processor, a memory, and a storage device to. The update control method includes a step of controlling, when a software update process of the electronic control unit is executed, a timing for executing an approval request process for requesting an approval for the software update process according to a type of non-volatile memory included in an electronic control unit to be updated.

A third aspect of the present disclosure is a non-transitory storage medium storing a program which is executable on a computer including a processor, a memory, and a storage device to control software update of an electronic control unit and causes the computer to execute a function. The function includes controlling, when a software update process of the electronic control unit is executed, a timing for executing an approval request process for requesting an approval for the software update process according to a type of non-volatile memory included in an electronic control unit to be updated.

A server according to a fourth aspect of the present disclosure includes a storage unit configured to store, for every piece of vehicle identification information for identifying a vehicle, a kind of non-volatile memory included in an electronic control unit mounted on the vehicle, a communication unit configured to receive, from the vehicle, a confirmation request that includes the vehicle identification information, and a control unit configured to determine whether there is update data of software of the vehicle identified by the vehicle identification information included in the confirmation request when the communication unit receives the confirmation request. When the control unit determines that there is the update data of the software of the vehicle, the communication unit may transmit, to the vehicle, instruction information for an instruction on a timing for executing an approval request process based on the kind of non-volatile memory included in an electronic control unit to be updated.

A fifth aspect of the present disclosure is an OTA master that controls a software update of an electronic control unit. The OTA master includes a control unit configured to control a timing for executing an approval request process for requesting an approval for the software update process according to a kind of non-volatile memory included in an electronic control unit to be updated when a software update process of the electronic control unit is executed.

A center according to a sixth aspect of the present disclosure includes a storage unit configured to store, for every piece of vehicle identification information for identifying a vehicle, a kind of non-volatile memory included in an electronic control unit mounted on the vehicle, a communication unit configured to receive, from the vehicle, a confirmation request that includes the vehicle identification information, and a control unit configured to determine whether there is update data of software of the vehicle identified by the vehicle identification information included in the confirmation request when the communication unit receives the confirmation request. When the control unit determines that there is the update data of the software of the vehicle, the communication unit may transmit, to the vehicle, instruction information for an instruction on a timing for executing an approval request process based on the kind of non-volatile memory included in an electronic control unit to be updated.

The present disclosure provides a software update apparatus, an update control method, a non-transitory storage medium storing an update control program, a server, an OTA master, and a center that can change a user's approval timing according to specifications of an electronic control unit at the time of software update.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
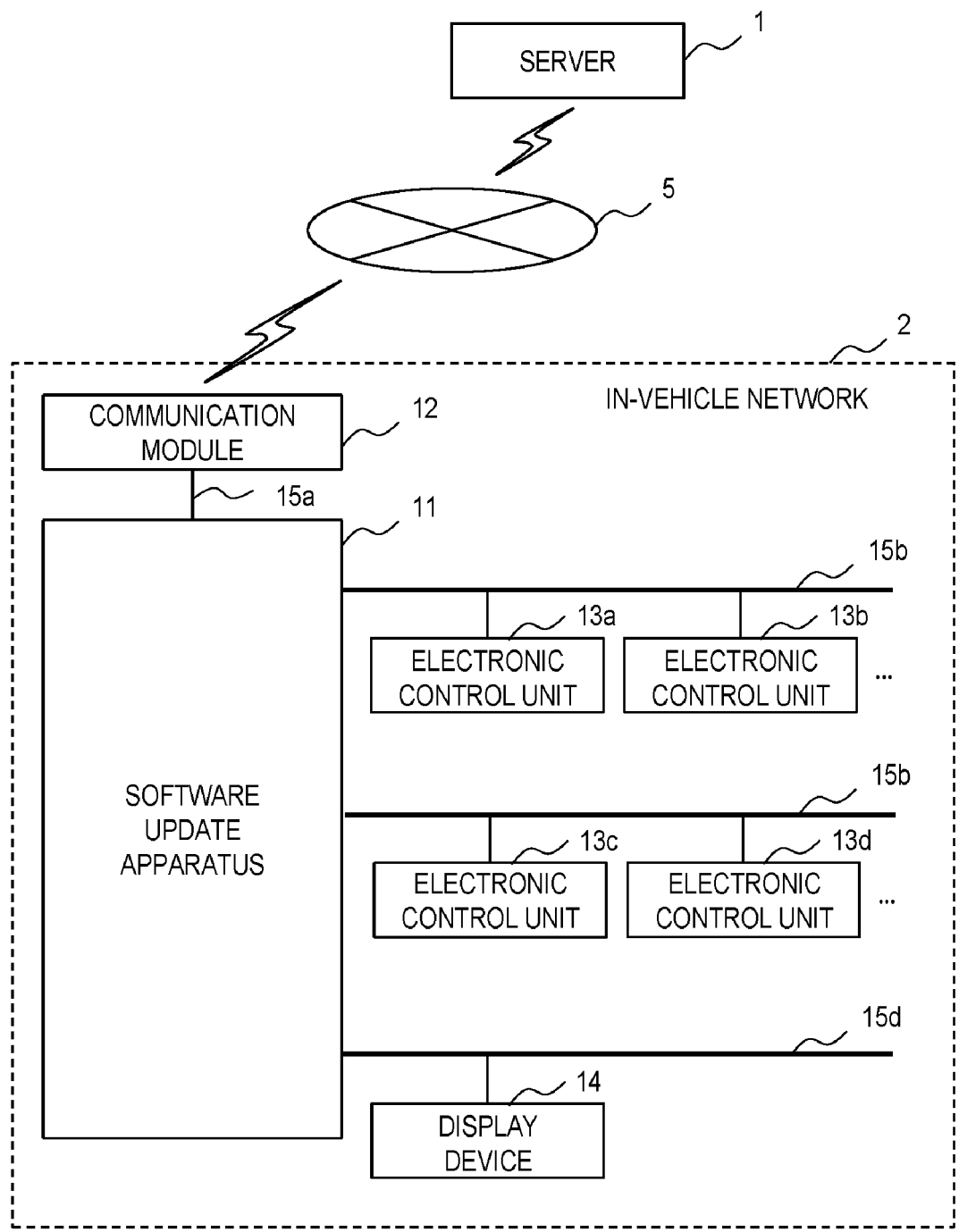
FIG. 1 is a block diagram illustrating an overall configuration of a network system according to an embodiment.
Figure 2:
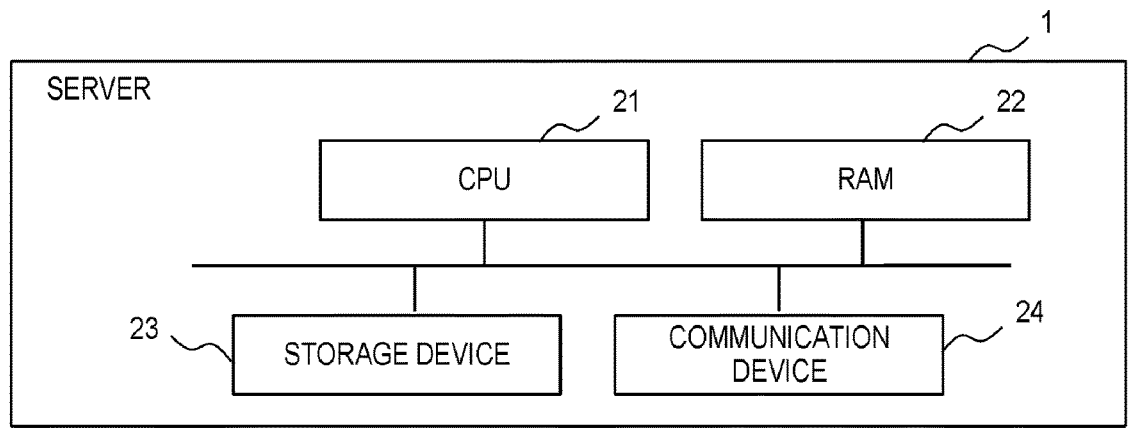
FIG. 2 is a block diagram illustrating a schematic configuration of a server illustrated in FIG. 1.
Figure 3:
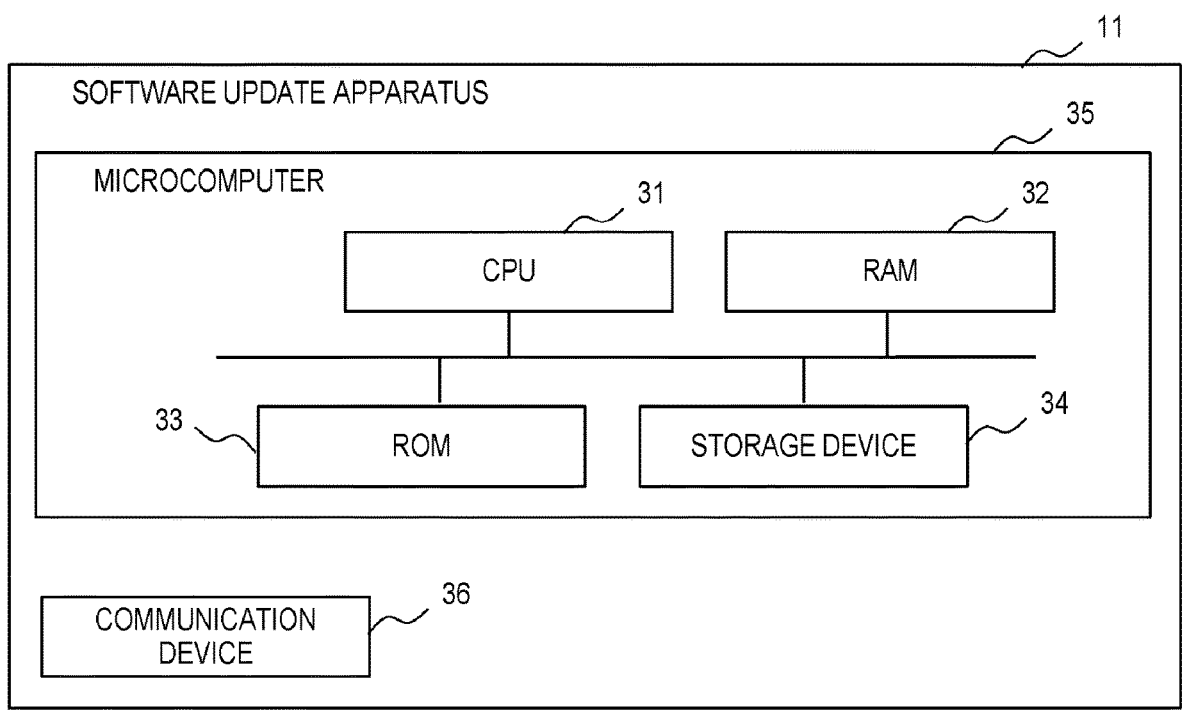
FIG. 3 is a block diagram illustrating a schematic configuration of a software update apparatus illustrated in FIG. 1.

FIG. 1 is a block diagram illustrating an overall configuration of a network system according to an embodiment. FIG. 2 is a block diagram illustrating a schematic configuration of a server illustrated in FIG. 1. FIG. 3 is a block diagram illustrating a schematic configuration of a software update apparatus illustrated in FIG. 1.

The network system illustrated in FIG. 1 is used for updating software of electronic control units (ECUs) 13a to 13d mounted on a vehicle and includes a server 1 (a center) and an in-vehicle network 2 mounted on the vehicle.

The server 1 can communicate with a software update apparatus 11 mounted on the vehicle via a network 5, and manages software update of the electronic control units 13a to 13d mounted on the vehicle.

As illustrated in FIG. 2, the server 1 includes a CPU 21, a RAM 22, a storage device 23, and a communication device 24. The storage device 23 includes a readable and writable storage medium, such as a hard disk or an SSD, and stores a program for executing software update management, information used for the update management, or update data of an electronic control unit. In the server 1, the CPU 21 executes a program read from the storage device 23 using the RAM 22 as a work area to execute a control process to be described below. The communication device 24 communicates with the software update apparatus 11 via a network.

The in-vehicle network 2 includes the software update apparatus 11 (an OTA master), a communication module 12, the plurality of electronic control units 13a to 13d, and a display device 14. The software update apparatus 11 is connected to the communication module 12 via a bus 15a, to the electronic control units 13a, 13b via a bus 15b, to the electronic control units 13c, 13d via a bus 15c, and to the display device 14 via a bus 15d. The software update apparatus 11 can wirelessly communicate with the server 1 via the communication module 12. Based on update data acquired from the server 1, the software update apparatus 11 controls the software update of an electronic control unit to be updated from among the electronic control units 13a to 13d. The software update apparatus 11 is sometimes referred to as a central gateway. The communication module 12 is a communication device that connects the in-vehicle network 2 to the server 1. The electronic control units 13a to 13d control an operation of each part of the vehicle. At the time of a software update process of the electronic control units 13a to 13d, the display device 14 (an HMI) is used for displaying various displays, such as a display of whether there is update data, a display of an approval request screen used for requesting an approval for the software update from a user or an administrator, or a display of an update result. As the display device 14, a display device of a car navigation system can be typically used, but a type of display device 14 is not particularly limited as long as it can display information required at the time of the update process of a program. In FIG. 1, four electronic control units 13a to 13d are illustrated, but the number of electronic control units is not particularly limited. Further, an electronic control unit in addition to the display device 14 may be further connected to the bus 15d illustrated in FIG. 1.

As illustrated in FIG. 3, the software update apparatus 11 includes a microcomputer 35, which includes a CPU 31, a RAM 32, a ROM 33, and a storage device 34, and a communication device 36. In the software update apparatus 11, the CPU 31 of the microcomputer 35 executes a program read from the ROM 33 using the RAM 32 as a work area to execute a control process to be described below. The communication device 36 communicates with the communication module 12, the electronic control units 13a to 13d, and the display device 14 via the buses 15a to 15d illustrated in FIG. 1.

Figure 4A:
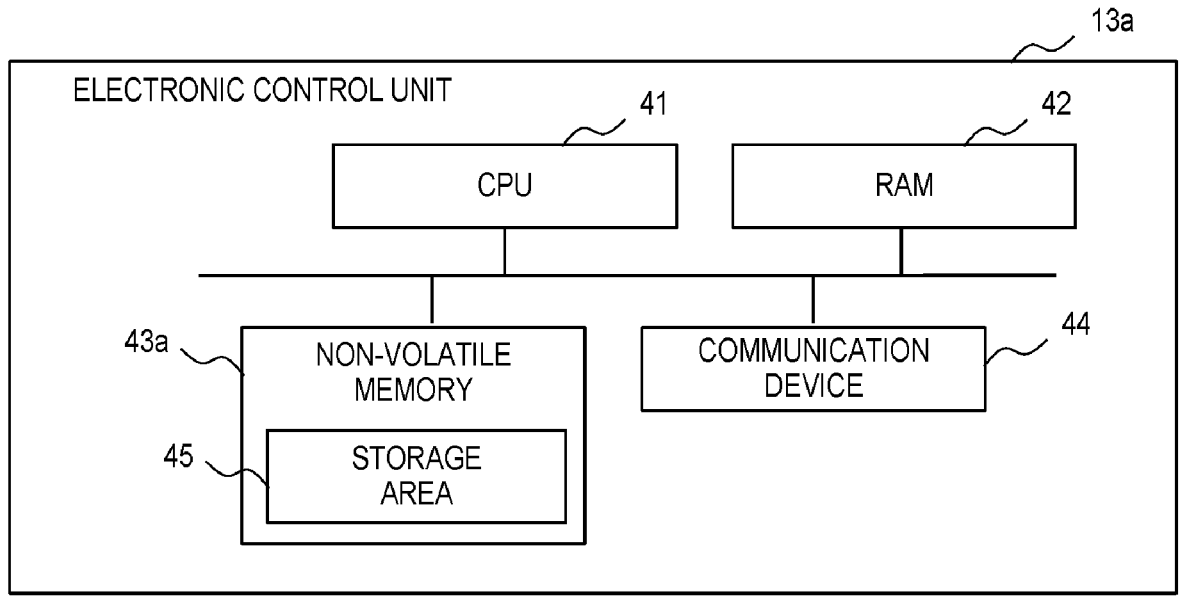
FIG. 4A is a block diagram illustrating a schematic configuration of an electronic control unit.
Figure 4B:
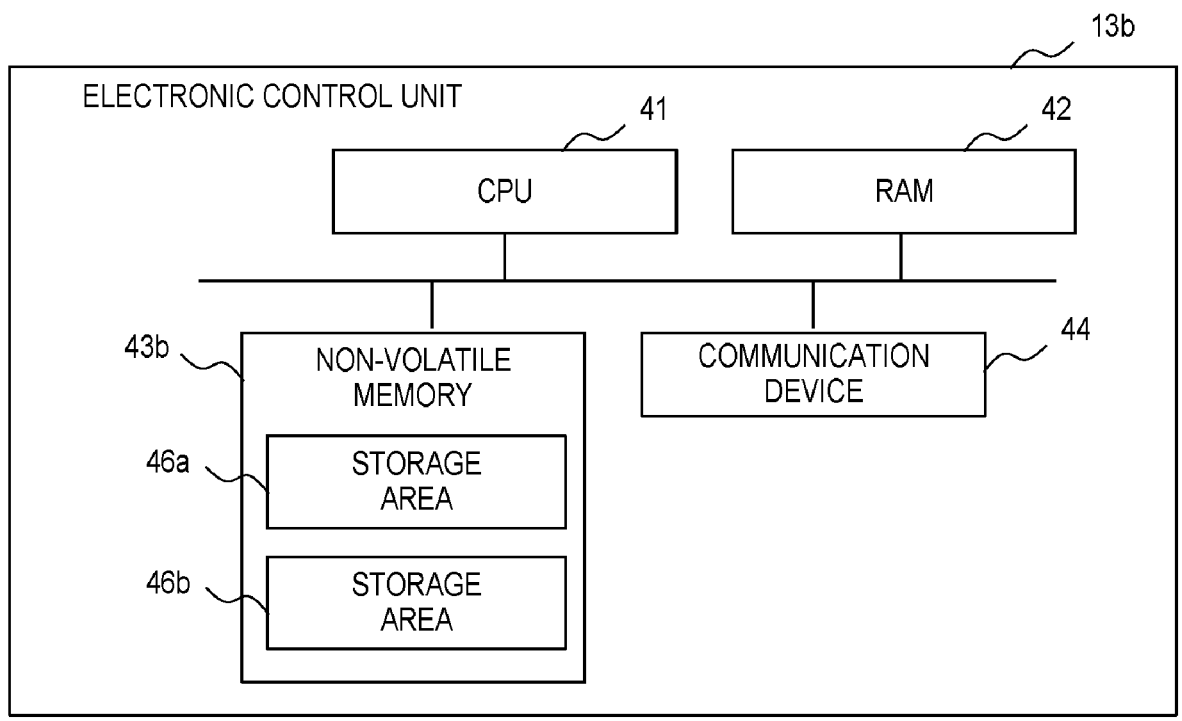
FIG. 4B is another block diagram illustrating a schematic configuration of an electronic control unit.

FIGS. 4A and 4B are block diagrams illustrating schematic configurations of the electronic control units 13a to 13d.

The electronic control unit 13a illustrated in FIG. 4A includes a CPU 41, a RAM 42, a non-volatile memory 43a, and a communication device 44. The CPU 41 executes a program read from the non-volatile memory 43a using the RAM 42 as a work area to implement a function of the electronic control unit 13a. The non-volatile memory 43a includes one storage area 45 used for storing software. Hereinbelow, a type of volatile memory 43a having this configuration is referred to as a "first type". In addition to the software used for implementing a function of the electronic control unit 13a, the storage area 45 may store version information, parameter data, a boot program for booting, a program for software update, or the like. The communication device 44 communicates with the software update apparatus 11, the other electronic control units 13b to 13d connected to the in-vehicle network 2, and the display device 14.

In the same manner as the electronic control unit 13a, the electronic control unit 13b illustrated in FIG. 4B includes the CPU 41, the RAM 42, a non-volatile memory 43b, and the communication device 44. However, the non-volatile memory 43b mounted on the electronic control unit 13b includes two storage areas 46a, 46b used for storing a program. Hereinbelow, a type of non-volatile memory 43b having this configuration is referred to as a "second type". In addition to the software used for implementing a function of the electronic control unit 13b, the storage areas 46a, 46b may store version information, parameter data, a boot program for booting, a program for software update, or the like. The CPU 41 of the electronic control unit 13b sets any one of the two storage areas 46a, 46b included in the non-volatile memory 43b as a storage area that is a target for reading (an operational side), and executes software stored in the storage area that is a target for reading. During the execution of the program in the storage area (the operational side) that is a target for reading, update data can be written on the background of the other one of the storage areas 46a, 46b that is not a target for reading (a non-operational side). At the time of activation in the software update process, an updated software version can be activated by switching the storage area that is a target for reading the program, using the CPU 41. As a specific example, it is assumed that current software is stored in the storage area 46a and the updated software version is installed in the storage area 46b. When an instruction to activate the updated software version is received from the software update apparatus 11, it is possible to switch the storage area that is the target for reading of the CPU 41 (the operational side) and execute the updated software version installed in the storage area 46b by, for example, switching a read start address of the CPU 41 from a head address of the storage area 46a to a head address of the storage area 46b. However, in the present disclosure, a configuration referred to as "a one-sided suspension memory" is also classified as the second-type memory. In the one-sided suspension memory, a storage area of one side is pseudo-divided into two sides, and a program can be written on the other side while a program is being executed on one side.

Figure 5:
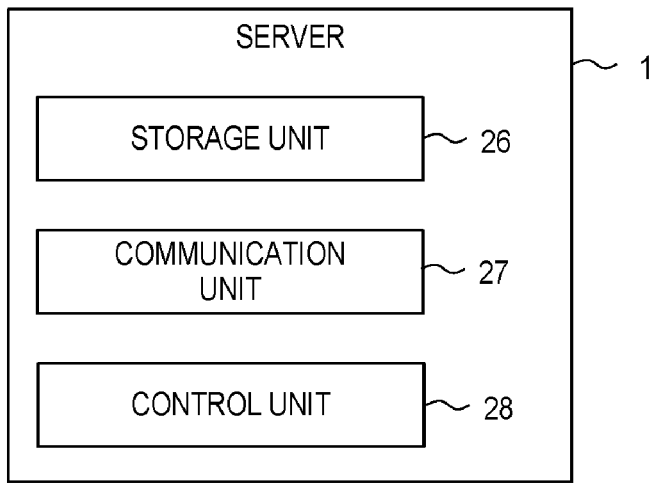
FIG. 5 is a functional block diagram of the server illustrated in FIG. 1.

FIG. 5 is a functional block diagram of the server 1 illustrated in FIG. 1.

The server 1 includes a storage unit 26, a communication unit 27, and a control unit 28. Functions of the communication unit 27 and the control unit 28 are implemented when the CPU 21 illustrated in FIG. 2 executes a program stored in the storage device 23 using the RAM 22, and a function of the storage unit 26 is implemented by the storage device 23 illustrated in FIG. 2.

The storage unit 26 stores update management information in which each piece of vehicle identification information (a vehicle ID) for identifying the vehicle is associated with information indicating software that can be used on one or more electronic control units mounted on the vehicle, and software update data of the electronic control units. As information indicating the software that can be used on the electronic control units, for example, a combination of the latest version information of the software of each of the plurality of electronic control units is defined.

The communication unit 27 can receive an update confirmation request of software from the software update apparatus 11. The update confirmation request may be, for example, information transmitted from the software update apparatus 11 to the server 1 when power or ignition is turned on in the vehicle, and information for requesting the server 1 to confirm whether there is the update data of the electronic control units. Further, the communication unit 27 receives a transmission request (a download request) for a distribution package from the software update apparatus 11. Upon receiving the download request for the distribution package, the communication unit 27 transmits the distribution package including the software update data of the electronic control unit to the software update apparatus 11.

When the communication unit 27 receives the update confirmation request, the control unit 28 determines whether there is the software update data of the vehicle specified by the vehicle ID, which is included in the update confirmation request, based on the update management information stored in the storage unit 26. Upon determining that there is the update data of the electronic control unit, in a case where the control unit 28 receives the download request for the distribution package from the software update apparatus 11, the control unit 28 generates the distribution package including the update data stored in the storage unit 26.

Figure 6:
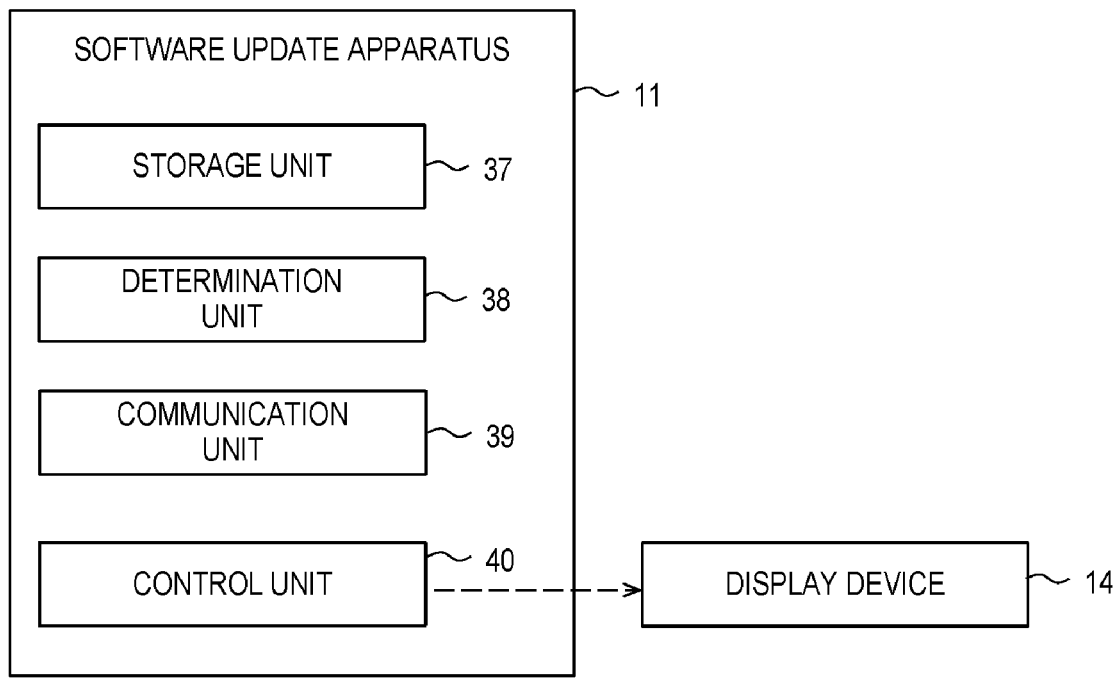
FIG. 6 is a functional block diagram of the software update apparatus illustrated in FIG. 1.

FIG. 6 is a functional block diagram of the software update apparatus illustrated in FIG. 1.

The software update apparatus 11 includes a storage unit 37, a determination unit 38, a communication unit 39, and a control unit 40. A function of the storage unit 37 is implemented by the storage device 34 illustrated in FIG. 3. Functions of the determination unit 38, the communication unit 39, and the control unit 40 are implemented when the CPU 31 illustrated in FIG. 3 executes a program stored in the ROM 33 using the RAM 32.

The storage unit 37 stores information indicating whether a type of non-volatile memory mounted on each of the electronic control units 13a to 13d is the first type or the second type. Information on the types of non-volatile memories mounted on the electronic control units 13a to 13d (type information) may be created in advance based on specifications of the electronic control units 13a to 13d that constitute the in-vehicle network 2, and stored in the storage unit 37 at the time of manufacturing the vehicle. Alternatively, at the time of the software update process, the communication unit 39 to be described below may acquire, via communication in the in-vehicle network 2, information indicating the type of non-volatile memory of the electronic control unit to be updated.

At the time of the update process, the determination unit 38 determines whether the type of non-volatile memory mounted on the electronic control unit to be updated is the first-type memory including one storage area or the second-type memory including two storage areas. The determination unit 38 can determine the type of non-volatile memory based on the type information of a non-volatile memory stored in the storage unit 37. As described above, the type information of the non-volatile memory stored in the storage unit 37 may be created in advance at the time of manufacturing the vehicle or the like, or may be created based on the information indicating the type of non-volatile memory that is acquired from the electronic control unit to be updated at the time of the software update process.

The communication unit 39 transmits the update confirmation request of the software to the server 1 when, for example, power or ignition of the vehicle is turned on. The update confirmation request includes the vehicle ID for identifying the vehicle and software versions of the electronic control units 13a to 13d connected to the in-vehicle network 2. The vehicle ID and the software versions of the electronic control units 13a to 13d are used for determining whether there is the software update data of the electronic control units by comparing them with the latest software version held by the server 1 for each vehicle ID. Further, as a response to the update confirmation request, the communication unit 39 receives a notification indicating whether there is the software update data from the server 1. When there is the software update data of the electronic control units, the communication unit 39 transmits the download request for the distribution package to the server 1 and receives the distribution package transmitted from the server 1. In addition to the update data, the distribution package may include verification data for verifying the authenticity of the update data, the number of pieces of update data, the installation order, various pieces of control information used at the time of software update, or the like. Further, at the time of the software update process, when acquiring the type information of the non-volatile memory of the electronic control unit from the electronic control unit to be updated, the communication unit 39 acquires the type information by communicating with the electronic control unit to be updated.

The control unit 40 determines whether there is the software update data of the electronic control unit based on the response to the update confirmation request received by the communication unit 39. The control unit 40 verifies the authenticity of the distribution package received from the server 1 by the communication unit 39 and stored in the storage unit 37. The control unit 40 transfers one or more pieces of downloaded update data to the electronic control unit to be updated, and causes the electronic control unit to be updated to install the update data. After completion of installation, the control unit 40 instructs the electronic control unit to be updated to validate the installed updated version of the software.

Here, when the non-volatile memory of the electronic control unit is the first-type memory, the installation and the activation are executed successively. Thus, the control unit 40 executes an approval request process for requesting an approval for the software update from the user or the administrator before the execution of the installation. On the other hand, when the non-volatile memory of the electronic control unit is the second-type memory, the control unit 40 executes the approval request process for the software update at least after the execution of the installation and before the execution of the activation. Alternatively, when the non-volatile memory of the electronic control unit is the second-type memory, the control unit 40 may execute the approval request process for the software update before the execution of the installation or omit the process.

In the approval request process, the control unit 40 causes an output device to output a notification indicating that an approval for the software update is required or a notification prompting an input indicating that the software update has been approved. As the output device, for example, a display device 14 provided in the in-vehicle network 2, a voice output device that executes a notification using voice can be used. For example, in the approval request process, when the display device 14 is used as the output device, the control unit 40 causes the display device 14 to display an approval request screen used for requesting the approval for the software update, and causes the display device 14 to display a notification prompting a specific input operation, such as pressing an approval button when the user or the administrator approves the software update. Further, in the approval request process, the control unit 40 causes the display device 14 to display text, an icon, or the like notifying the user or the administrator that there is the software update data of the electronic control unit, and causes the display device 14 to display restrictions or the like during the execution of the software update process.

The control unit 40 executes the approval request process at a timing according to the memory type of electronic control unit to be updated, and, upon receiving the input indicating that the user or the administrator has approved the software update, executes the above-described control processes for the installation and the activation, and updates the software of the electronic control unit to be updated.

Here, the software update process consists of a phase of downloading the update data from the server 1, a phase of transferring the downloaded update data to the electronic control unit to be updated and installing the update data in the storage area of the electronic control unit to be updated, and a phase of validating (activating) the installed updated version of the software on the electronic control unit to be updated.

Downloading is a process for receiving and storing the update data, which is transmitted from the server 1, for updating the software of the electronic control unit. The downloading phase includes not only receiving the update data, but also controlling a series of processes associated with the downloading, such as determining whether it is possible to execute the downloading and verifying the update data. Installation is a process for writing the updated version of a program (the update software) on the storage unit of the electronic control unit to be updated based on the downloaded update data. The installation phase includes not only executing the installation but also controlling a series of processes associated with the installation, such as determining whether it is possible to execute the installation, transferring the update data, and verifying the updated version of the program. Activation is a process for validating (activating) the installed updated version of the program. The activation phase includes not only executing the activation but also controlling a series of processes associated with the activation, such as determining whether it is possible to execute the activation, and verifying an execution result.

The update data transmitted from the server 1 to the software update apparatus 11 may include some of the update software of the electronic control unit, compressed data obtained by compressing the update software, the update software, or divided data obtained by dividing the compressed data. Further, the update data may include an identifier (an ECU ID) for identifying the electronic control unit to be updated and an identifier (an ECU software ID) for identifying the software before the updating. The update data is downloaded as the above-described distribution package, and the distribution package may include the update data of one or more electronic control units.

When the update data includes the update software itself, in the installation phase, the software update apparatus 11 transfers the update data (the update software) to the electronic control unit to be updated. On the other hand, when the update data includes the compressed data, difference data, or the divided data of the update software, the software update apparatus 11 may transfer the update data to the electronic control unit to be updated, and the electronic control unit to be updated may generate the update software from the update data. Alternatively, the software update apparatus 11 may generate the update software from the update data and transfer the update software to the electronic control unit to be updated. Here, the update software can be generated by decompressing the compressed data and assembling the difference data or the divided data.

The electronic control unit to be updated can install the update software based on an installation request from the software update apparatus 11. Alternatively, the electronic control unit to be updated that has received the update data may autonomously install the update software without receiving any explicit instruction from the software update apparatus 11.

The electronic control unit to be updated can activate the update software based on an activation request from the software update apparatus 11. Alternatively, the electronic control unit to be updated that has received the update data may autonomously activate the update software without receiving any explicit instruction from the software update apparatus 11.

Here, the software update process can be executed continuously or in parallel with each of the plurality of electronic control units.

Further, a "program update process" in the present specification includes not only a process for continuously executing all of the downloading, installation, and activation, but also a process for executing only a part of the downloading, installation, and activation.

Figure 7:
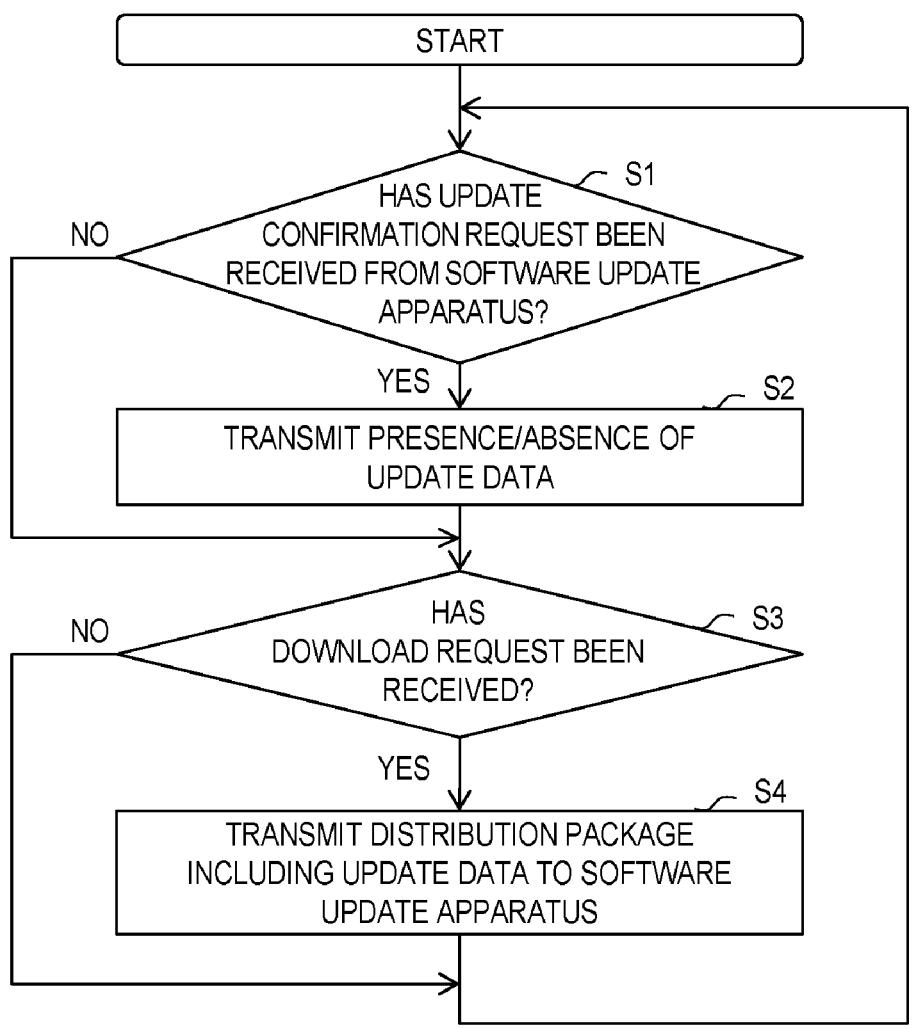
FIG. 7 is a flowchart illustrating an example of a control process executed by the server according to a first embodiment.

FIG. 7 is a flowchart illustrating an example of the control process executed by the server 1 according to the first embodiment. The control process illustrated in FIG. 7 is repeatedly executed at, for example, predetermined time intervals.

In step S1, the communication unit 27 determines whether the update confirmation request has been received from the software update apparatus 11. When the determination in step S1 is YES, the process proceeds to step S2. Otherwise, the process proceeds to step S3.

In step S2, the communication unit 27 transmits, to the vehicle that has transmitted the update confirmation request, information indicating whether there is the update software data of the electronic control unit. The control unit 28 can determine that there is the update data when, for example, the control unit 28 compares a combination of the software versions stored in the update management information associated with the vehicle ID, which is included in the update confirmation request, with a combination of the current software versions, which are included in the update confirmation request, and when the combination of the current software versions, which are included in the update confirmation request, is older than the combination of the versions stored in the update management information. Thereafter, the process proceeds to step S3.

In step S3, the communication unit 27 determines whether the download request for the distribution package has been received from the software update apparatus 11. When the determination in step S3 is YES, the process proceeds to step S4. Otherwise, the process returns to step S1.

In step S4, the communication unit 27 transmits the distribution package including the software update data to the software update apparatus 11. Thereafter, the process proceeds to step S1.

Figure 8:
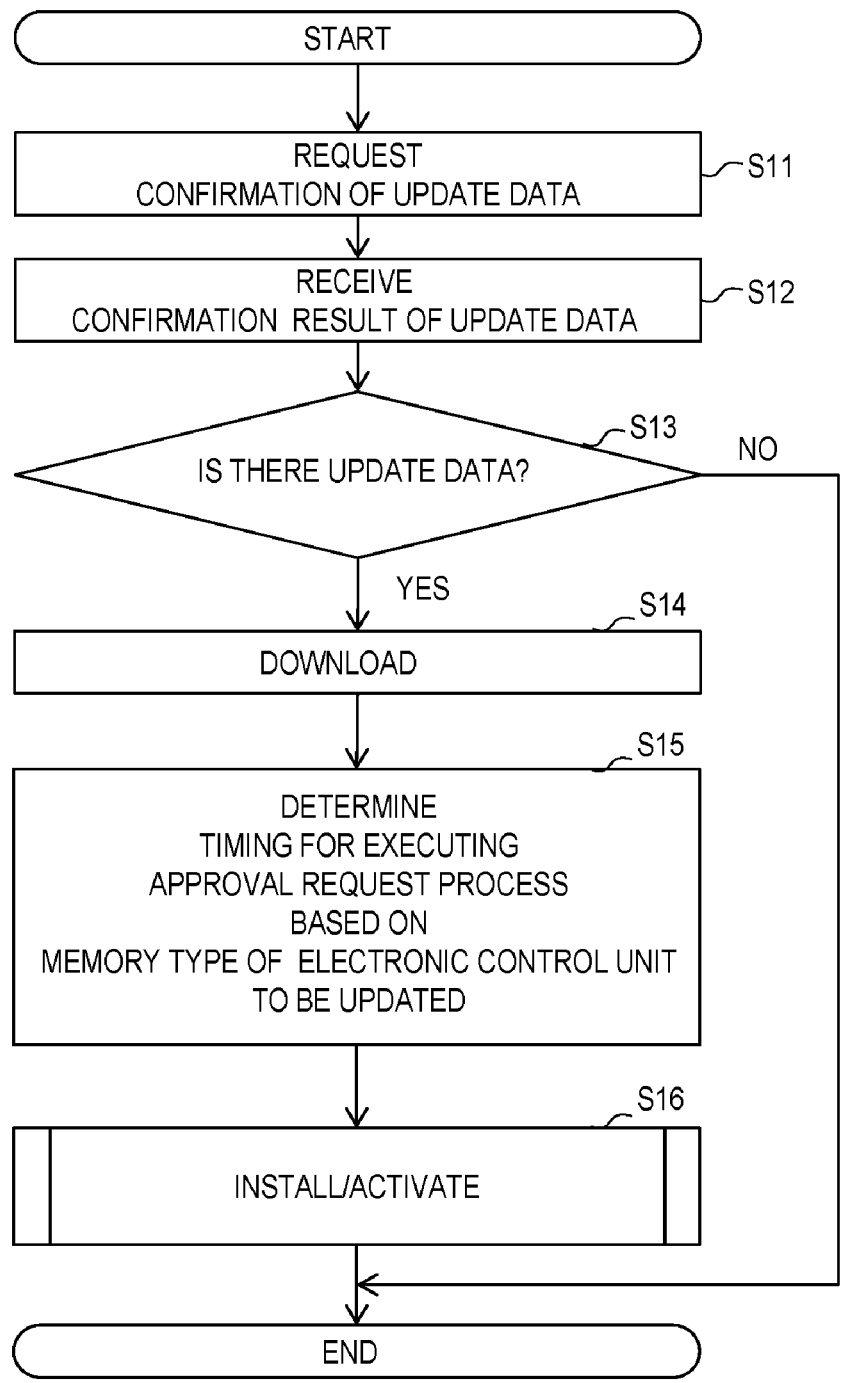
FIG. 8 is a flowchart illustrating an example of a control process executed by the software update apparatus according to the first embodiment.

FIG. 8 is a flowchart illustrating an example of a control process executed by the software update apparatus 11 according to the first embodiment. The control process illustrated in FIG. 8 is executed when, for example, power or ignition of the vehicle is turned on.

In step S11, the communication unit 39 transmits, to the server 1, the update confirmation request including the vehicle ID and a combination of the software versions of the electronic control units. Thereafter, the process proceeds to step S12.

In step S12, the communication unit 39 receives a confirmation result from the server 1. Thereafter, the process proceeds to step S13.

In step S13, based on the response from the server 1 to the update confirmation request transmitted in step S1, the control unit 40 determines whether there is the software update data of the electronic control units 13a to 13d. When the determination in step S13 is YES, the process proceeds to step S14. Otherwise, the process ends.

In step S14, the communication unit 39 executes the downloading process. More specifically, the communication unit 39 transmits the download request for the distribution package to the server 1, receives the distribution package transmitted in response to the download request, and stores the received distribution package in the storage unit 37. The control unit 40 verifies the authenticity of the update data included in the received distribution package. In step S14, the control unit 40 may determine whether it is possible to execute downloading, or notify the server 1 that the downloading has been completed. Thereafter, the process proceeds to step S15.

In step S15, the determination unit 38 determines the memory type of non-volatile memory included in the electronic control unit to be updated, and determines a timing for executing the approval request process. When the type information including the memory type of non-volatile memory mounted on each of the electronic control units 13a to 13d is stored in the storage unit 37 in advance, the determination unit 38 determines the memory type of electronic control unit to be updated based on the type information stored in the storage unit 37. Further, in step S15, the communication unit 39 may execute processes for acquiring information indicating the memory type by communicating with the electronic control unit to be updated and storing the memory type in the storage unit 37, and the determination unit 38 may determine the memory type of electronic control unit to be updated based on the type information stored in the storage unit 37 by the communication unit 39. When at least one of the electronic control units to be updated includes the first-type memory, it is necessary to obtain the approval before the installation. Thus, the determination unit 38 determines to execute the approval request process at least before the installation. In this case, the determination unit 38 may determine to execute the approval request process not only before the installation but also before the activation based on settings registered in advance. On the other hand, when all the electronic control units to be updated include the second-type memories, it is necessary to obtain the approval before the activation. Thus, the determination unit 38 determines to execute the approval request process at least before the activation. In this case, the determination unit 38 may determine to execute the approval request process not only before the activation but also before the installation based on the settings registered in advance. Thereafter, the process proceeds to step S16.

In step S16, the control unit 40 executes the installation process and the activation process for the electronic control unit to be updated and the process ends.

Figure 9:
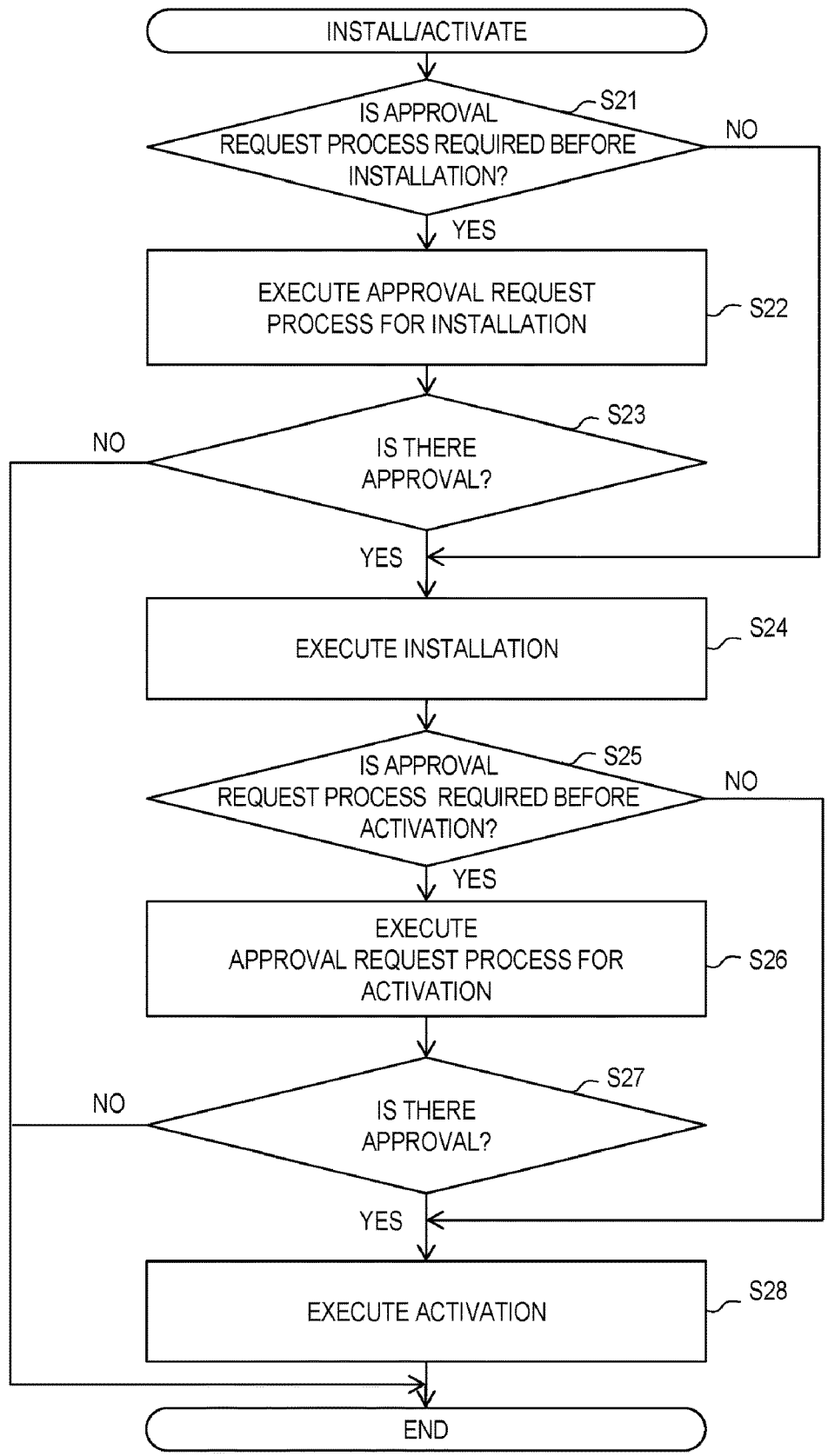
FIG. 9 is a flowchart illustrating details of an installation/activation process illustrated in FIG. 8.

FIG. 9 is a flowchart illustrating details of the installation/activation process illustrated in FIG. 8.

In step S21, the control unit 40 determines whether the approval request process is required before the execution of the installation based on the execution timing for the approval request process determined by the determination unit 38 in step S15 of FIG. 8. When the determination in step S21 is YES, the process proceeds to step S22. Otherwise, the process proceeds to step S24.

In step S22, the control unit 40 executes the approval request process for the installation. For example, the control unit 40 executes a display indicating that the software update of the electronic control unit is started, a display indicating that the user's approval for the software update is requested, and if necessary, a display showing time required to install the update data or the restrictions or precautions during the installation, and receives an operation input from the user using an input tool, such as a touch panel or an operation button. Thereafter, the process proceeds to step S23.

In step S23, the control unit 40 determines whether an operation input indicating the approval for the software update (the installation) has been executed. The operation input indicating the approval for the installation can be determined based on, for example, whether a button, such as "approve" or "start update", displayed on the display device 14 is pressed. Further, when the user desires to start the software update (the installation) later without immediately approving the start of the software update (the installation), the control unit 40 can receive the user's desire by a pressing of a button, such as "execute later", by the user. In this case, the control unit 40 determines NO in step S24. When the determination in step S23 is YES, the process proceeds to step S24. Otherwise, the process ends.

In step S24, the control unit 40 transfers the update data to the electronic control unit to be updated and instructs the electronic control unit to be updated to install. Thereafter, the process proceeds to step S25. The electronic control unit to be updated writes the update data received from the software update apparatus 11 on the software storage area.

In step S25, the control unit 40 determines whether the approval request process is required before the activation based on the execution timing for the approval request process determined by the determination unit 38 in step S15 of FIG. 8. When the determination in step S25 is YES, the process proceeds to step S26. Otherwise, the process proceeds to step S28.

In step S26, the control unit 40 executes the approval request process for the activation. For example, the control unit 40 executes a display indicating that the electronic control unit is ready for the software update or that the program is updated by executing a specific operation, such as turning off of power or ignition, and if necessary, a display showing time required to activate or the restrictions or the precautions during the activation, and receives an operation input by the user using an input tool, such as a touch panel or an operation button. Thereafter, the process proceeds to step S27.

In step S27, the control unit 40 determines whether an operation input indicating the approval for the software update (the installation) has been executed. The operation input indicating the approval for the activation can be determined based on, for example, whether a button, such as "approve" or "update", displayed on the display device 14 is pressed. Further, when the user desires to start the software update later without immediately approving the software update (the activation), the control unit 40 can receive the user's desire by a pressing of a button, such as "execute later", by the user. In this case, the control unit 40 determines NO in step S27. When the determination in step S27 is YES, the process proceeds to step S28. Otherwise, the process ends.

In step S28, the control unit 40 instructs the electronic control unit to be updated to activate the updated software version. Thereafter, the process ends. Here, when a specific operation, such as turning off of power or ignition, is executed, the electronic control unit to be updated is restarted, and the software after the updating is executed. As a result, the software update (a function update) of the electronic control unit is completed.

As described above, when the non-volatile memory mounted on the electronic control unit to be updated is the first-type memory, the current software is overwritten by installing the update data. Thus, the electronic control unit to be updated is influenced at the stage of installing the update data. Therefore, when the electronic control unit having the first-type memory mounted thereon is included in the electronic control units to be updated, it is necessary to execute the approval request process for requesting an approval before the update data is written. Receiving an approval is a condition for starting the installation. On the other hand, when the non-volatile memory mounted on the electronic control unit to be updated is the second-type memory, the electronic control unit to be updated is influenced at the stage of activating the updated software version after the installation, not at the stage of installing the update data. Therefore, when all of the electronic control units to be updated are the electronic control units having the second-type memories mounted thereon, it is necessary to cause the display device 14 to display an approval request screen used for requesting an approval from the user after installing the update data and before activating the updated software version. The user's approval for the program update (validating the update program) is necessary for executing the approval request process for requesting the approval and receiving an approval is a condition for starting the activation.

At the time of the software update, the software update apparatus 11 according to the present embodiment changes the execution timing for the approval request process according to the type of non-volatile memory of the electronic control unit to be updated. Therefore, with the software update apparatus according to the present embodiment, it is possible to request an approval at an appropriate timing according to the specifications of the electronic control unit to be updated.

Specifically, when the non-volatile memory mounted on at least one electronic control unit to be updated is the first-type memory, the software update apparatus 11 causes the display device 14 to display the approval request screen before the update program is written on the storage area of the non-volatile memory. On the other hand, when all of the non-volatile memories mounted on the electronic control units to be updated are the second-type memories, the software update apparatus 11 causes the display device 14 to display the approval request screen after the update data is installed in the storage area that is not a target for reading included in the non-volatile memory and before the storage area on which the updated software version is written is activated. Therefore, with the software update apparatus 11 according to the present embodiment, it is possible to execute the approval request process at an appropriate timing according to the number of the storage areas included in the non-volatile memory mounted on the electronic control unit to be updated.

Modified Example of First Embodiment

In the above example, a configuration where the software update apparatus 11 determines the approval request process based on information indicating the memory types of electronic control units 13a to 13d stored in the storage unit 37 in advance or the memory type acquired via communication from the electronic control unit to be updated has been described. Since the configuration (the type or the memory type) of the electronic control units 13a to 13d mounted on the vehicle is managed by the server 1, the information indicating the type of non-volatile memory of the electronic control unit to be updated may be acquired from the server 1 by the communication unit 39 via communication and stored in the storage unit 37. In the case of such a configuration, in step S4 of FIG. 7, the communication unit 27 of the server 1 includes the update data and the information indicating the memory type of electronic control unit to be updated in the distribution package and transmits the distribution package to the vehicle. In the software update apparatus 11, the control unit 40 can determine the execution timing for the approval request process by executing the process of step S15 based on the information indicating the memory type of electronic control unit to be updated, which is included in the distribution package received by the communication unit 39 in step S14 of FIG. 8.

Second Embodiment

In the above-described first embodiment, a configuration where the software update apparatus 11 includes the storage unit that stores information indicating the memory types of electronic control units 13a to 13d and controls the execution timing for the approval request process based on the information indicating the memory type of electronic control units 13a to 13d stored in the storage unit in advance or the memory types acquired by the software update apparatus 11 from the electronic control units 13a to 13d or the server 1 via communication, has been described. On the other hand, in the present embodiment, the server 1 holds, in the storage unit 26, the information indicating the types of the non-volatile memories mounted on the electronic control units 13a to 13d and transmits instruction information for an instruction on the execution timing for the approval request process to the software update apparatus 11 of the vehicle. Hereinafter, differences between the present embodiment and the first embodiment will be mainly described.

Figure 10:
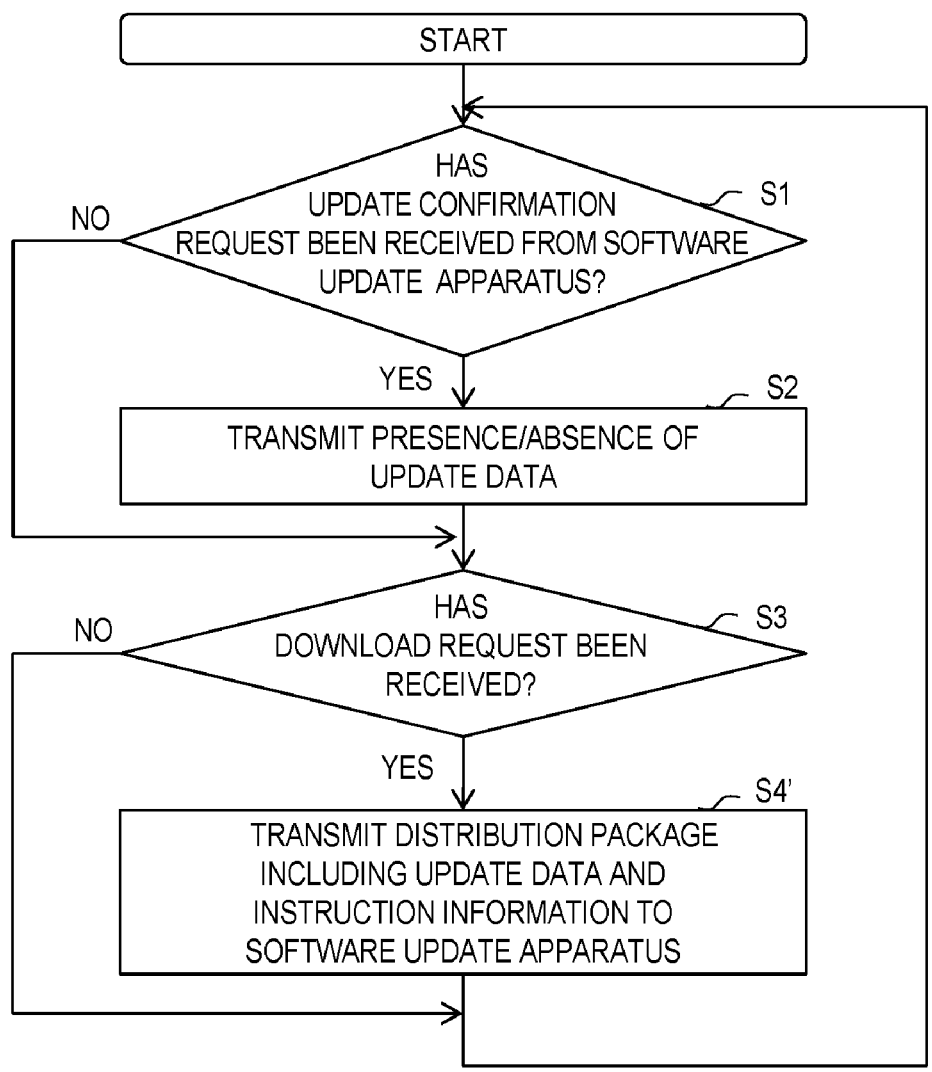
FIG. 10 is a flowchart illustrating an example of a control process executed by the server according to a second embodiment.

FIG. 10 is a flowchart illustrating an example of the control process executed by the server according to the second embodiment. In the control process illustrated in FIG. 10, step S4' replaces step S4 of the control process illustrated in FIG. 7.

Upon receiving the download request for the distribution package from the software update apparatus 11 in step S3, in step S4', the communication unit 27 transmits, to the software update apparatus 11, the distribution package including the software update data of the electronic control unit and the instruction information. The instruction information is for an instruction on the execution timing for the approval request process when the software update apparatus 11 executes the software update process and is generated according to the type of non-volatile memory mounted on the electronic control unit to be updated. For example, the instruction information can be generated when the control unit 28 executes procedures hereinbelow.

First, the control unit 28 specifies the electronic control unit for which it is determined that there is the update data in step S2 and its memory type in association with the vehicle specified by the vehicle ID, which is included in the download request received in step S3. The type of electronic control unit mounted on each vehicle and the type of memory thereon are registered in advance in the storage unit 26 of the server 1 at the time of manufacturing or the like. Therefore, the control unit 28 can acquire the memory type of each of the electronic control units to be updated (that is, the electronic control units for which it is determined that there is the update data) that is determined in step S2, based on the information registered in advance. Next, the control unit 28 generates instruction information according to the memory type of non-volatile memory mounted on the electronic control unit to be updated. Specifically, when the electronic control unit having the first-type memory mounted thereon is included in the electronic control units to be updated, the control unit 28 generates information for an instruction to execute the approval request process before the installation in which the electronic control unit to be updated is substantially influenced. On the other hand, when all of the electronic control units to be updated are electronic control units having the second-type memories mounted thereon, the control unit 28 generates the information for the instruction to execute the approval request process before the activation in which the electronic control unit to be updated is substantially influenced. The communication unit 27 includes, in the distribution package, the update data of the electronic control unit to be updated and the instruction information generated by the control unit 28 and transmits the distribution package to the vehicle that has transmitted the download request.

Figure 11:
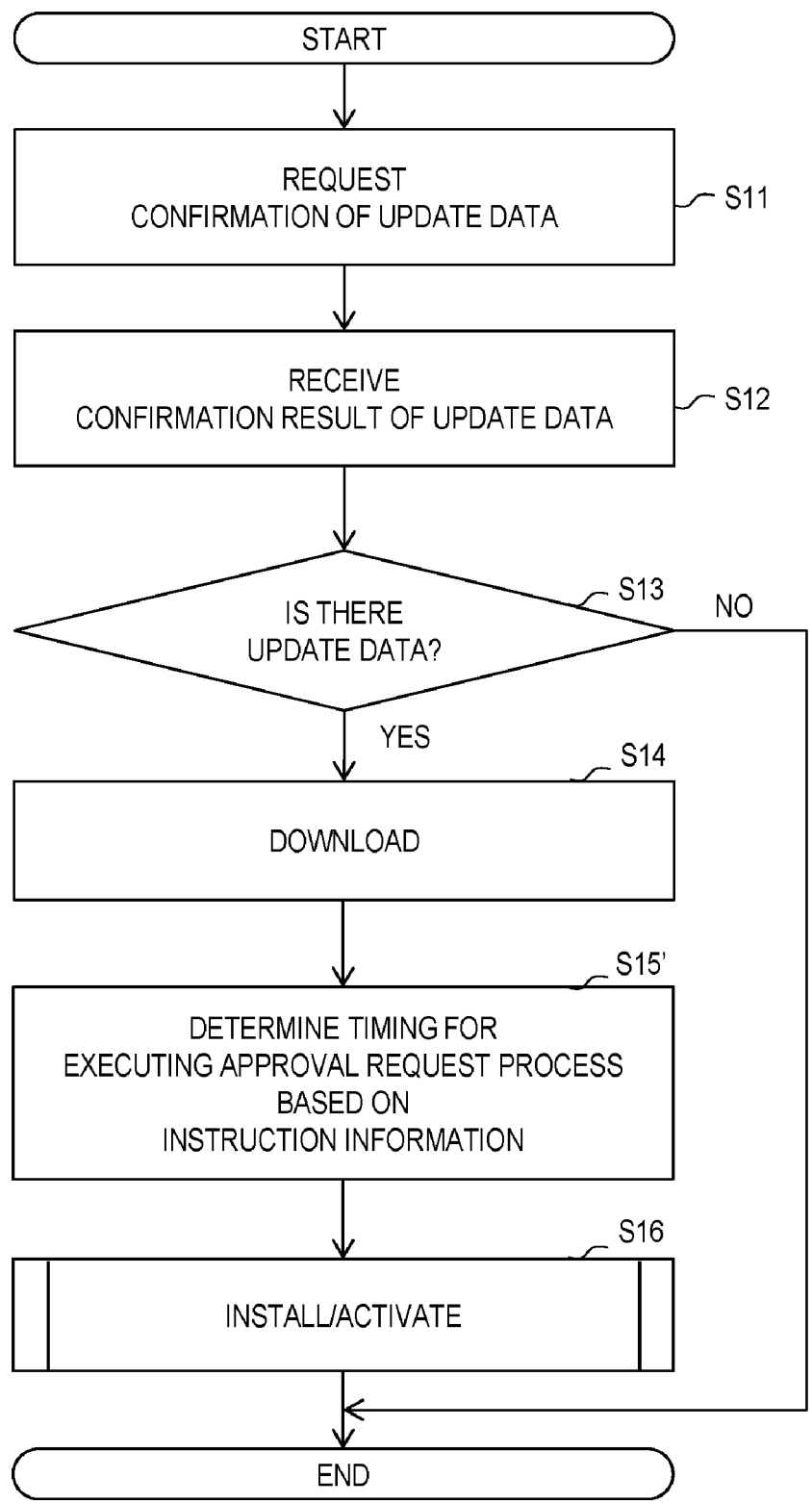
FIG. 11 is a flowchart illustrating an example of a control process executed by the software update apparatus according to the second embodiment.

FIG. 11 is a flowchart illustrating an example of a control process executed by the software update apparatus 11 according to the second embodiment. In the control process illustrated in FIG. 11, step S15' replaces step S15 of the control process illustrated in FIG. 8.

When the communication unit 39 receives the distribution package in the software update apparatus 11 (step S14), in step S15', the control unit 40 determines the execution timing for the approval request process based on the instruction information included in the distribution package. In the installation/activation processes of step S16 (FIG. 9), determinations on steps S21 and S25 illustrated in FIG. 9 are executed based on the execution timing determined in step S15.

As in the present embodiment, with the configuration where the server 1 generates the instruction information for an instruction on the execution timing for the approval request process and transmits the instruction information to the vehicle, it is not necessary for the software update apparatus 11 to determine the memory type of electronic control unit to be updated. Thus, it is possible to simplify the control process of the software update apparatus 11.

The functions of the server 1 illustrated in each of the above embodiments can be implemented as an update management method executed by a computer that includes a processor (a CPU), a memory, and a storage device, as an update management program executed by the computer, or as a computer-readable non-transitory storage medium that stores the update management program. Similarly, the functions of the software update apparatus 11 exemplified in the embodiments can be implemented as an update control method executed by an in-vehicle computer including a processor (a CPU), a memory, and a storage device, as a computer control program executed by the in-vehicle computer, or as a computer-readable non-transitory storage medium that stores the update control program.

In each of the above embodiments, an example, in which the software update apparatus 11 provided in the in-vehicle network 2 on the vehicle side controls, as the master device, the program update of all the electronic control units 13a to 13d, has been described. However, instead of the software update apparatus 11, one of the electronic control units 13a to 13d may have the update control function illustrated in FIGS. 8 and 9, and may control the program update of other electronic control units. Alternatively, instead of providing the software update apparatus 11, it is also possible to provide the update control function illustrated in FIGS. 8 and 9 in an external device that can be connected to the in-vehicle network 2 in a wired manner and execute the program update process of the electronic control units 13a to 13d using the external device.

The disclosed technology is applicable to a network system used for updating a program of an electronic control unit.

What is claimed is:

1. A software update apparatus that controls a software update of an electronic control device, the software update apparatus comprising:
   a microcomputer that is configured to, when a software update process of the electronic control device is executed, control a timing for executing an approval request process for requesting an approval for the software update process according to a type of non-volatile memory included in an electronic control device to be updated,
   wherein the microcomputer is further configured to:
   when the non-volatile memory mounted on at least one electronic control device to be updated is a first-type memory, execute the approval request process before update data is installed in a storage area of the non-volatile memory; and
   when the non-volatile memory mounted on the electronic control device to be updated is a second-type memory, execute the approval request process after the update data is installed in the storage area, which is not a target to be read, of the non-volatile memory and before the storage area in which the update data is installed is activated as a target to be read.

2. The software update apparatus according to claim 1, further comprising:
   a determination unit configured to determine whether the non-volatile memory mounted on the electronic control device to be updated is the first-type memory including one storage area or the second-type memory including two storage areas,
   wherein the microcomputer is configured to, based on a determination result by the determination unit, control the timing for executing the approval request process.

3. The software update apparatus according to claim 2, further comprising:
   a memory storing the type of non-volatile memory mounted on the electronic control device,
   wherein the determination unit is configured to, based on the type of non-volatile memory stored in the memory, determine the type of non-volatile memory of the electronic control device to be updated.

4. The software update apparatus according to claim 2, further comprising:
   a communication unit that is configured to receive, from a server, the type of non-volatile memory mounted on the electronic control device; and
   a memory storing the received type of non-volatile memory,
   wherein the determination unit is configured to, based on the type of non-volatile memory stored in the memory, determine the type of non-volatile memory of the electronic control device to be updated.

5. The software update apparatus according to claim 1, further comprising:
a communication unit that is configured to receive, from a server, instruction information for an instruction on the timing for executing the approval request process based on the type of non-volatile memory included in the electronic control device to be updated,
wherein the microcomputer is configured to, based on the received instruction information, control the timing for executing the approval request process.

6. The software update apparatus according to claim 1, wherein the microcomputer is configured to cause a display device to display a screen used for requesting the approval for the software update in the approval request process.

7. A non-transitory storage medium storing a program executable on a computer including a processor, a memory, and a storage device to control software update of an electronic control device, the program causing the computer to execute the following function:
controlling, when a software update process of an electronic control device is executed, a timing for executing an approval request process for requesting an approval for the software update process according to a type of non-volatile memory included in an electronic control device to be updated, by:
executing, when the non-volatile memory mounted on the electronic control device to be updated is a first-type memory, the approval request process before update data is installed in a storage area of the non-volatile memory; and
executing, when the non-volatile memory mounted on the electronic control device to be updated is a second-type memory, the approval request process after the update data is installed in a storage area, which is not a target to be read, of the non-volatile memory and before the storage area in which the update data is installed is activated as a target to be read.

8. An over the air (OTA) master that controls a software update of an electronic control device, the OTA master comprising:
a microcomputer configured to, when a software update process of the electronic control device is executed, control a timing for executing an approval request process for requesting an approval for the software update process according to a type of non-volatile memory included in an electronic control device to be updated,
wherein the microcomputer is configured to:
when the non-volatile memory mounted on the electronic control device to be updated is a first-type memory, execute the approval request process before update data is installed in a storage area of the non-volatile memory; and
when the non-volatile memory mounted on the electronic control device to be updated is a second-type memory, execute the approval request process after the update data is installed in the storage area, which is not a target to be read, of the non-volatile memory and before the storage area in which the update data is installed is activated as a target to be read.

* * * * *